United States Patent
Pon et al.

(10) Patent No.: US 11,894,919 B2
(45) Date of Patent: Feb. 6, 2024

(54) RADIO FREQUENCY RECEIVE CHAIN CONTROL FOR RECEIVING SATELLITE POSITIONING SIGNALS

(71) Applicant: QUALCOMM Incorporated, San Diego, CA (US)

(72) Inventors: Rayman Pon, Cupertino, CA (US); Pranav Iyengar, San Diego, CA (US); Liang Zhao, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/411,864

(22) Filed: Aug. 25, 2021

(65) Prior Publication Data
US 2023/0067256 A1    Mar. 2, 2023

(51) Int. Cl.
*H04W 76/25* (2018.01)
*H04K 3/00* (2006.01)
*H04B 7/22* (2006.01)
*H04W 64/00* (2009.01)
*H04W 88/02* (2009.01)

(52) U.S. Cl.
CPC .............. *H04K 3/22* (2013.01); *H04B 7/22* (2013.01); *H04W 64/003* (2013.01); *H04W 76/25* (2018.02); *H04W 88/02* (2013.01)

(58) Field of Classification Search
CPC ...... H04K 3/22; H04W 76/25; H04W 64/003; H04W 84/06; H04W 88/02; H04B 7/22
See application file for complete search history.

(56) References Cited

U.S. PATENT DOCUMENTS

| 8,169,366 B2 | 5/2012 | Conroy et al. |
| 2008/0291113 A1* | 11/2008 | Ou-Yang ................ H04K 3/226 343/876 |
| 2010/0048155 A1 | 2/2010 | Wang |
| 2015/0160350 A1* | 6/2015 | Waters .................... G01S 19/36 342/352 |
| 2017/0279520 A1* | 9/2017 | Kitazawa ........... H04B 7/18513 |
| 2019/0235088 A1 | 8/2019 | Tanaka et al. |

FOREIGN PATENT DOCUMENTS

| JP | 2019075647 A * 5/2019 ............ G01S 19/05 |
| KR | 20130011129 A    1/2013 |

OTHER PUBLICATIONS

Fabio G., et al., "NAPA: A Fully Integrated Multi-Constellation Two-Frequency Single-Chip GNSS Receiver", 2014 IEEE/ION Position, Location and Navigation Symposium—PLANS 2014, IEEE, May 5, 2014, XP032616463, pp. 1075-1083, figure 3.
International Search Report and Written Opinion—PCT/US2022/036163—ISA/EPO—dated Nov. 21, 2022.

* cited by examiner

*Primary Examiner* — Keith Ferguson
(74) *Attorney, Agent, or Firm* — Thien T. Nguyen

(57) ABSTRACT

A satellite signal processing method includes: receiving, at a user equipment, a first satellite signal of a first frequency band from at least one satellite of a constellation of satellites; receiving, at the user equipment, a second satellite signal of a second frequency band and from the at least one satellite of the constellation of satellites; and controlling an activation status of at least one of: a first satellite signal receive chain, of the user equipment, configured to measure the first satellite signal; or a second satellite signal receive chain, of the user equipment, configured to measure the second satellite signal.

26 Claims, 14 Drawing Sheets

Controlling the activation status of the at least one of the first satellite signal receive chain or the second satellite signal receive chain based on a configured positioning performance of the user equipment, or a detected satellite signal condition, or a combination thereof ⟵ 830

FIG. 8

Controlling the activation status of the at least one of the first satellite signal receive chain or the second satellite signal receive chain based on at least one of a positioning accuracy or a signal acquisition speed ⟵ 930

FIG. 9

Controlling the first satellite signal receive chain to be active in response to receiving a request to acquire a third satellite signal from the at least one satellite of the constellation of satellites, wherein the first satellite signal has at least one of fewer associated search hypotheses than the second satellite signal or a smaller bandwidth than the second satellite signal — 1030

FIG. 10

Controlling an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal — 1130

FIG. 11

Controlling the second satellite signal receive chain to be active, and at least one component of the first satellite signal receive chain to be inactive, in response to receiving a request to track the at least one satellite of the constellation of satellites with the second satellite signal, wherein the first satellite signal has a smaller bandwidth than the second satellite signal ⟶ 1230

FIG. 12

Controlling the second satellite signal receive chain to be active, and the at least one component of the first satellite signal receive chain to be inactive, based on determining that a time uncertainty of the user equipment is below a time uncertainty threshold and a position uncertainty of the user equipment is below a position uncertainty threshold ⟶ 1330

FIG. 13

1430 — Controlling the activation status of the first satellite signal receive chain to be active, and the activation status of the second satellite signal receive chain to be active, in response to receiving a request to validate an acquired satellite signal from the at least one satellite of the constellation of satellites

FIG. 14

1530 — Controlling an activation status of at least one component of the second satellite signal receive chain to be inactive in response to validation of the acquired satellite signal

FIG. 15

1630 — Controlling, periodically, the second satellite signal receive chain to be active, while the first satellite signal receive chain is active and in response to receiving the request to validate the acquired satellite signal, to validate the acquired satellite signal

FIG. 16

Controlling the first satellite signal receive chain to be active, and the second satellite signal receive chain to be active, in response to receiving a request to determine an ionospheric delay from the at least one satellite of the constellation of satellites ⟵ 1730

FIG. 17

Controlling, periodically, the second satellite signal receive chain to be active while the first satellite signal receive chain is active and in response to receiving the request to determine the ionospheric delay ⟵ 1830

FIG. 18

Controlling at least one of the first satellite signal receive chainto be active, or the second satellite signal receive chain to be active, or a combination thereof, based on:

signal acquisition speeds associated with acquiring the first satellite signal and acquiring the second satellite signal, and a desired satellite signal acquisition speed; or position accuracy associated with the first satellite signal and the second satellite signal, and a desired position accuracy; or a combination thereof

Controlling, in response to detection of jamming of the first satellite signal, at least one component of the first satellite signal receive chain to be inactive and the second satellite signal receive chain to be active

Controlling, while the first satellite signal receive chain is active, the second satellite signal receive chain to become active, and then controlling the first satellite signal receive chain to become inactive in response to receiving a request to track the at least one satellite of the constellation of satellites with the second satellite signal ⟶ 2130

FIG. 21

Using one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active ⟶ 2200

FIG. 22

RADIO FREQUENCY RECEIVE CHAIN CONTROL FOR RECEIVING SATELLITE POSITIONING SIGNALS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Positions of devices, such as mobile devices, may be determined using terrestrial-based positioning signals and/or satellite positioning signals. Satellite positioning system receivers may be included in various devices for receiving and measuring satellite positioning signals. Measurements of the satellite positioning signals may be processed to determine position information, such as ranges between satellites and the receiver and/or a position estimate for the receiver.

SUMMARY

In an embodiment, a user equipment includes: a memory; a controller communicatively coupled to the memory; and a satellite positioning system receiver communicatively coupled to the controller and comprising: a first satellite signal receive chain configured to receive a first satellite signal, of a first frequency band, from at least one satellite of a constellation of satellites; and a second satellite signal receive chain configured to measure a second satellite signal, of a second frequency band, from the at least one satellite of the constellation of satellites; where the controller is configured to control an activation status of at least one of the first satellite signal receive chain or the second satellite signal receive chain.

In an embodiment, a satellite signal processing method includes: receiving, at a user equipment, a first satellite signal of a first frequency band from at least one satellite of a constellation of satellites; receiving, at the user equipment, a second satellite signal of a second frequency band and from the at least one satellite of the constellation of satellites; and controlling an activation status of at least one of: a first satellite signal receive chain, of the user equipment, configured to measure the first satellite signal; or a second satellite signal receive chain, of the user equipment, configured to measure the second satellite signal.

In an embodiment, a user equipment includes: means for measuring a first satellite signal of a first frequency band from at least one satellite of a constellation of satellites; means for measuring a second satellite signal of a second frequency band and from the at least one satellite of the constellation of satellites; and means for controlling an activation status of at least one of the means for measuring the first satellite signal or the means for measuring the second satellite signal.

In an embodiment, a non-transitory, processor-readable storage medium includes processor-readable instructions to cause a processor of a user equipment to: control an activation status of at least one of a first satellite signal receive chain of the user equipment or a second satellite signal receive chain of the user equipment; wherein the first satellite signal receive chain is configured to measure a first satellite signal, of a first frequency band, from at least one satellite of a constellation of satellites; and where the second satellite signal receive chain is configured to measure a second satellite signal, of a second frequency band and from the at least one satellite of the constellation of satellites.

BRIEF DESCRIPTION OF THE DRAWINGS

FIG. 8 is a block diagram of an example of a stage of controlling activation status shown in FIG. 7.

FIG. 9 is a block diagram of an example of the stage of controlling activation status shown in FIG. 8.

FIG. 10 is a block diagram of an example of the stage of controlling activation status shown in FIG. 7.

FIG. 11 is a block diagram of an example of the stage of controlling activation status shown in FIG. 10.

FIG. 12 is a block diagram of an example of the stage of controlling activation status shown in FIG. 7.

FIG. 13 is a block diagram of an example of the stage of controlling activation status shown in FIG. 12.

FIG. 14 is a block diagram of an example of the stage of controlling activation status shown in FIG. 7.

FIG. 15 is a block diagram of an example of the stage of controlling activation status shown in FIG. 14.

FIG. 16 is a block diagram of an example of the stage of controlling activation status shown in FIG. 14.

FIG. 17 is a block diagram of an example of the stage of controlling activation status shown in FIG. 7.

FIG. 18 is a block diagram of an example of the stage of controlling activation status shown in FIG. 17.

FIG. 19 is a block diagram of an example of the stage of controlling activation status shown in FIG. 7.

FIG. 20 is a block diagram of an example of the stage of controlling activation status shown in FIG. 7.

FIG. 21 is a block diagram of an example of the stage of controlling activation status shown in FIG. 7.

FIG. 22 is a block diagram of another stage of the method shown in FIG. 7.

DETAILED DESCRIPTION

Figure 1:
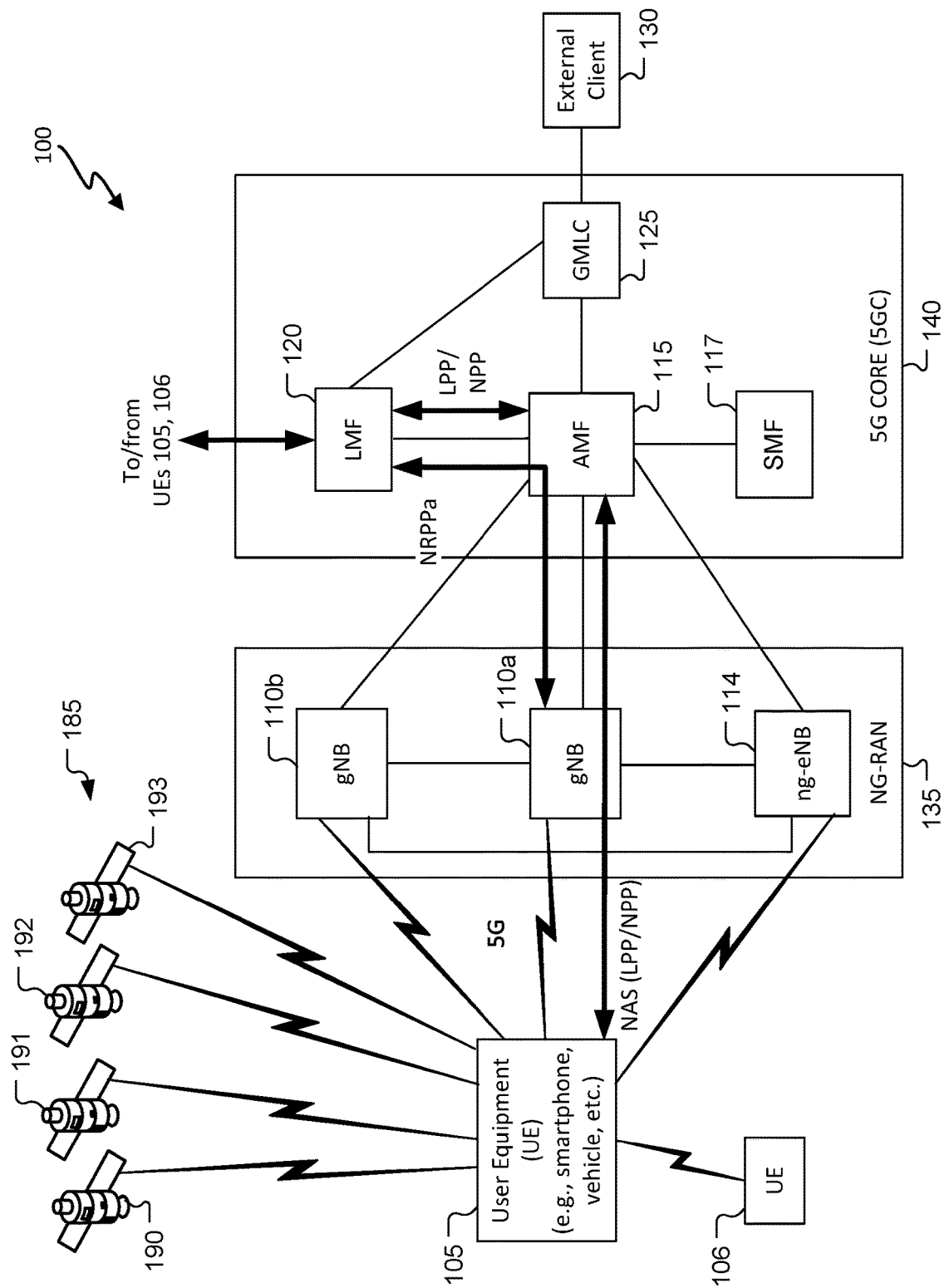
FIG. 1 is a simplified diagram of an example wireless communications system.

Techniques are discussed herein for selectively controlling activation status of one or more components for receiving satellite signals from at least one satellite of a satellite constellation, e.g., from the same at least one satellite. For example, separate radio frequency (RF) receive chains (e.g., filters, downconverters, correlators, processing components for determining measurements, etc.) may be provided for each of at least two satellite signals in different frequency bands. One or more of the paths may be controlled to be active or inactive (e.g., enabled or disabled) based on one or more factors. For example, a path associated with faster signal acquisition (e.g., time to first fix) may be active, and the other path(s) inactive (e.g., one or more components of each of the other path(s) disabled), based on a desire to acquire a presently-unacquired satellite signal. As another example, a path associated with higher position resolution may be controlled to be active, and one or more other paths controlled to be inactive, based on a desire for high-accuracy positioning, e.g., based on a high-resolution mode being selected by a user. As another example, a receive chain for a jammed signal may be controlled to be inactive and another receive chain controlled to be active. As another example, multiple receive chains may be activated concurrently, e.g., in order to measure one or more atmospheric characteristics (e.g., ionospheric delay) and/or for soft handoff of signal tracking. As another example, one or more receive chains may be controlled to be inactive in order to conserve power, e.g., battery power, and/or to conserve resources such as processor instructions (e.g., CPU MIPS (central processing unit million instructions per second)). For example, a processor may be powered but signals of a receive chain not processed, thus saving MIPS resources for processing the signals (and corresponding power). These are examples, and other examples (of UEs and/or criteria) may be implemented.

Items and/or techniques described herein may provide one or more of the following capabilities, as well as other capabilities not mentioned. Satellite signal acquisition may be expedited while conserving power consumption. Desired positioning accuracy based on satellite signals may be satisfied while conserving power consumption. Power may be saved for tracking a satellite, e.g., by performing soft handoff from tracking with one satellite signal to tracking with another satellite signal from the same satellite, and/or using one or more parameters (e.g., one or more satellite characteristics and/or one or more signal characteristics) determined from tracking with one satellite signal to facilitate acquisition of and/or tracking with the other satellite signal. Processing resources may be conserved, e.g., by avoiding processing of signals of a receive chain. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), the Quasi-Zenith Satellite System (QZSS, also called Michibiki), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

Figure 2:
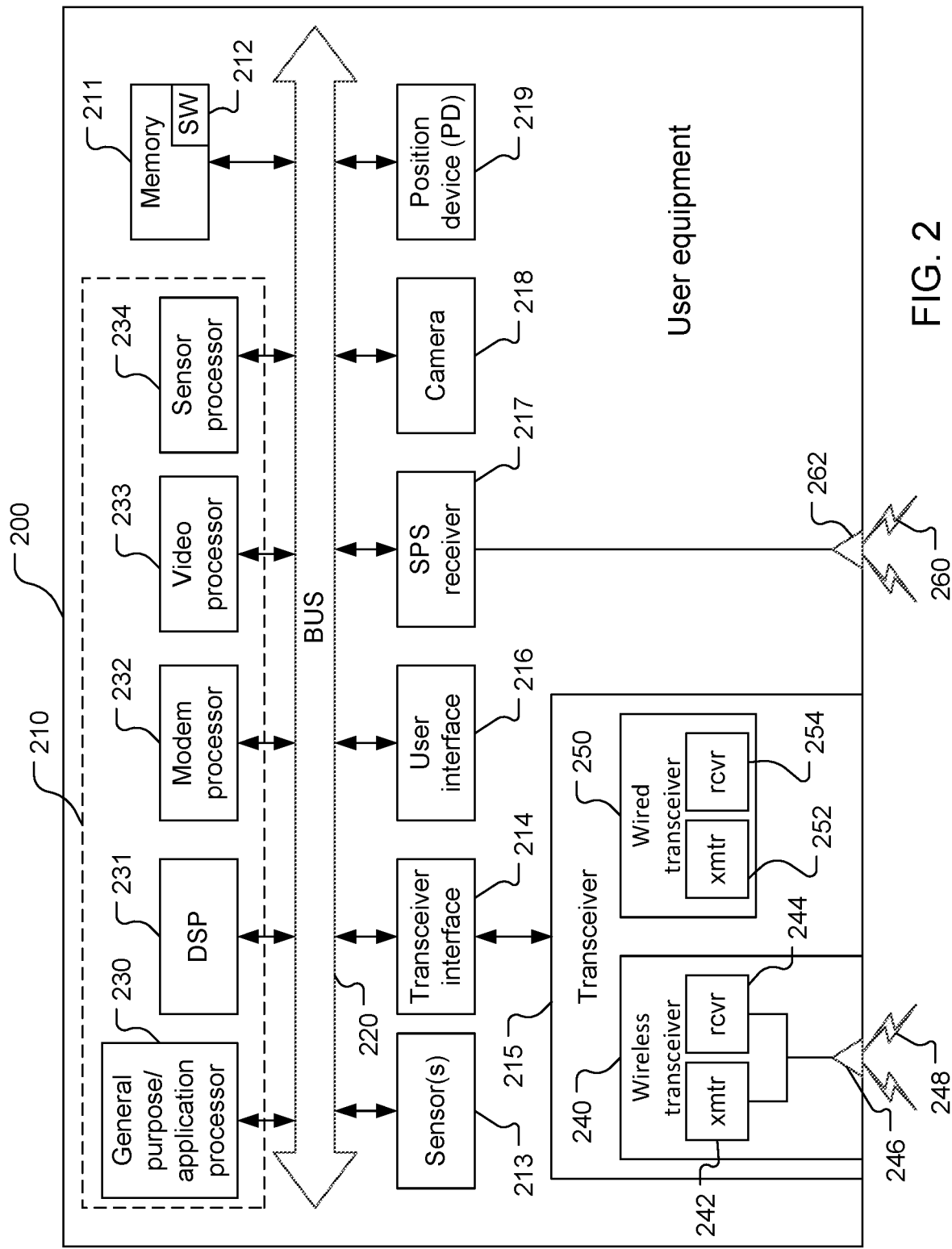
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

Figure 3:
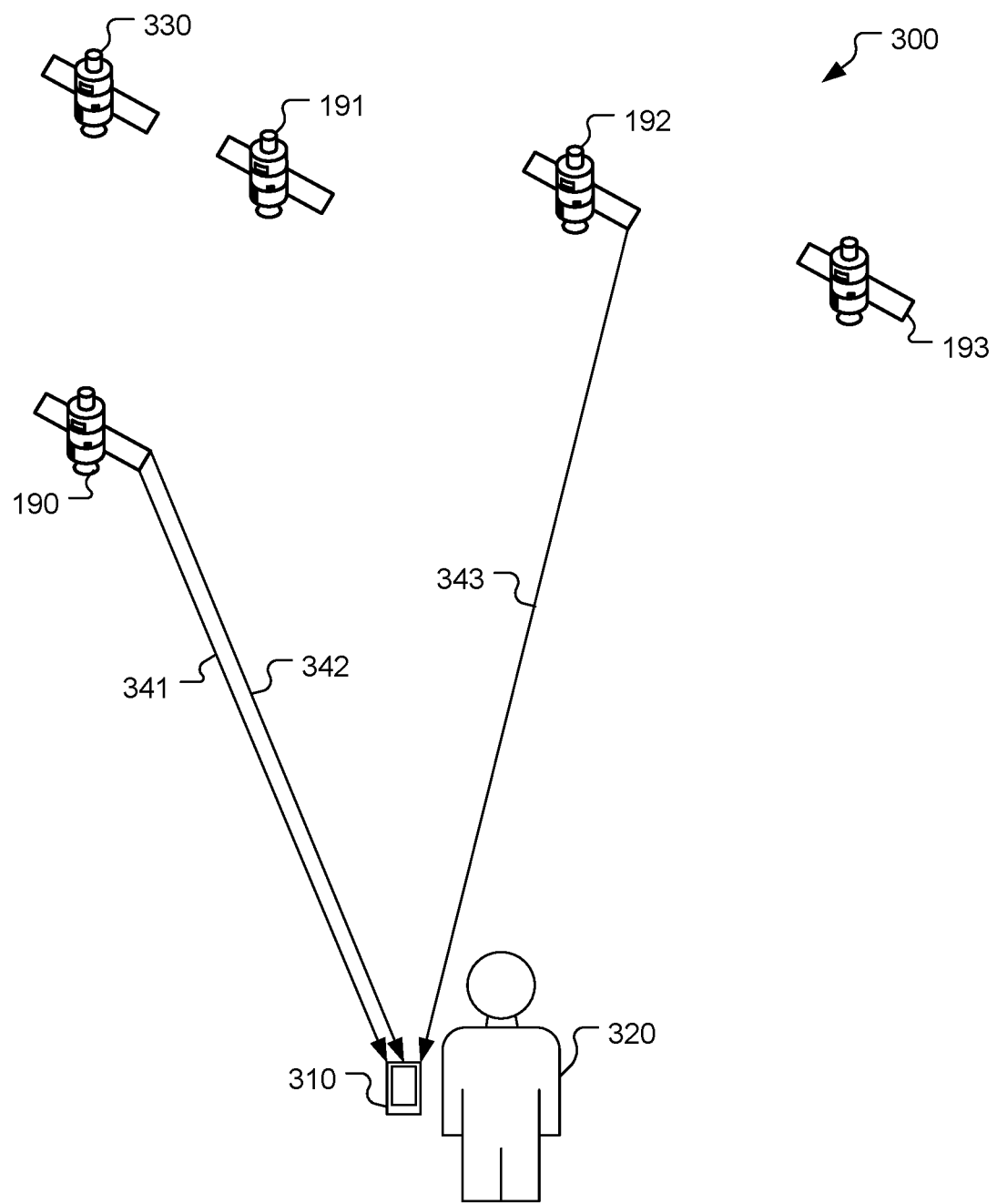
FIG. 3 is a simplified diagram of a navigation environment.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof Multi-Frequency Band Satellite Signal Processing Referring also to FIG. 3, in a navigation environment 300, a UE 310 associated with (e.g., held by) a user 320 may receive satellite signals from the satellites 190-193 and one or more other satellites such as a satellite 330. The satellites 190-193 are members of a satellite constellation, i.e., a group of satellites that are part of a system, e.g., controlled by a common entity such as a government, and orbiting in complementary orbits to facilitate determining positions of entities around the world. The satellite 330 is a member of a different constellation than the constellation of which the satellites 190-193 are members. The satellites 190-193 may be, for example, members of the BPS, Galileo, Beidou, GLONASS, or QZSS constellation. The satellites 190-193 may each transmit multiple satellite signals in different frequency bands, e.g., the satellite 190 may transmit a satellite signal 341 and a satellite signal 342 that have frequencies in different frequency bands, e.g., L1 and L2/L5 frequency bands, the satellites 191 and 193 may transmit signals in the same frequency bands (not shown), and a satellite signal 343 from the satellite 192 may have a frequency in only one frequency band, e.g., the L1 frequency band.

Figure 4:
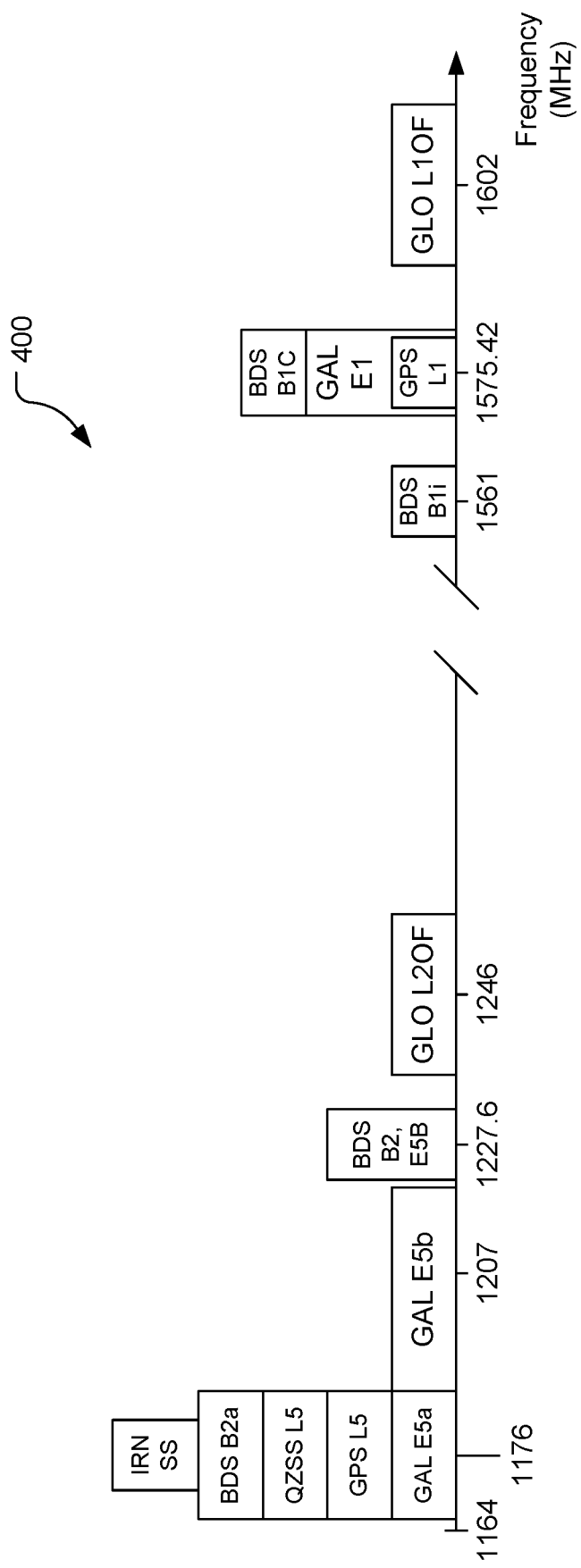
FIG. 4 is a frequency band plot of satellite signals and frequencies of the satellite signals.

Referring also to FIG. 4 (which, like other figures, is not shown to scale), a frequency band plot 400 shows that GNSS constellations operate on several frequencies in the L-Band. The L1 frequency band typically covers frequencies from 1559 MHz to 1606 MHz and includes L1 signals from GPS, Galileo, Beidou, GLONASS, and QZSS GNSS constellations. These same constellations also transmit concurrently using another frequency in the L2 frequency band and/or the L5 frequency band. The L2 and L5 signals may complement the L1 signals, which have been used for many years. For example, the L5 signals have wider signal bandwidth than the L1 signals, which helps improve positioning performance in multi-path environments. Also, using the L5 signals in addition to the L1 signals provides frequency diversity. The L2 and L5 signals are far enough away in frequency from the L1 signals that different processing paths may be used to measure the L2 and L5 signals versus the L1 signals. While the discussion herein focuses on the L1, L2, and L5 bands, the discussion (including the claims) are not limited to these bands, nor is the discussion limited to the use of satellite signals in two or three bands.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BeiDou and is broken into five bands, the L1 Band: 1575.42 MHz, L2: 1227.60 MHz, L3 Band: 1381.05 MHz, L5 Band: 176.45 MHz. For location purposes, the L1 band has historically been used by commercial GNSS receivers. However, measuring GNSS signals across more than one band may provide for improved accuracy and availability.

Figure 5:
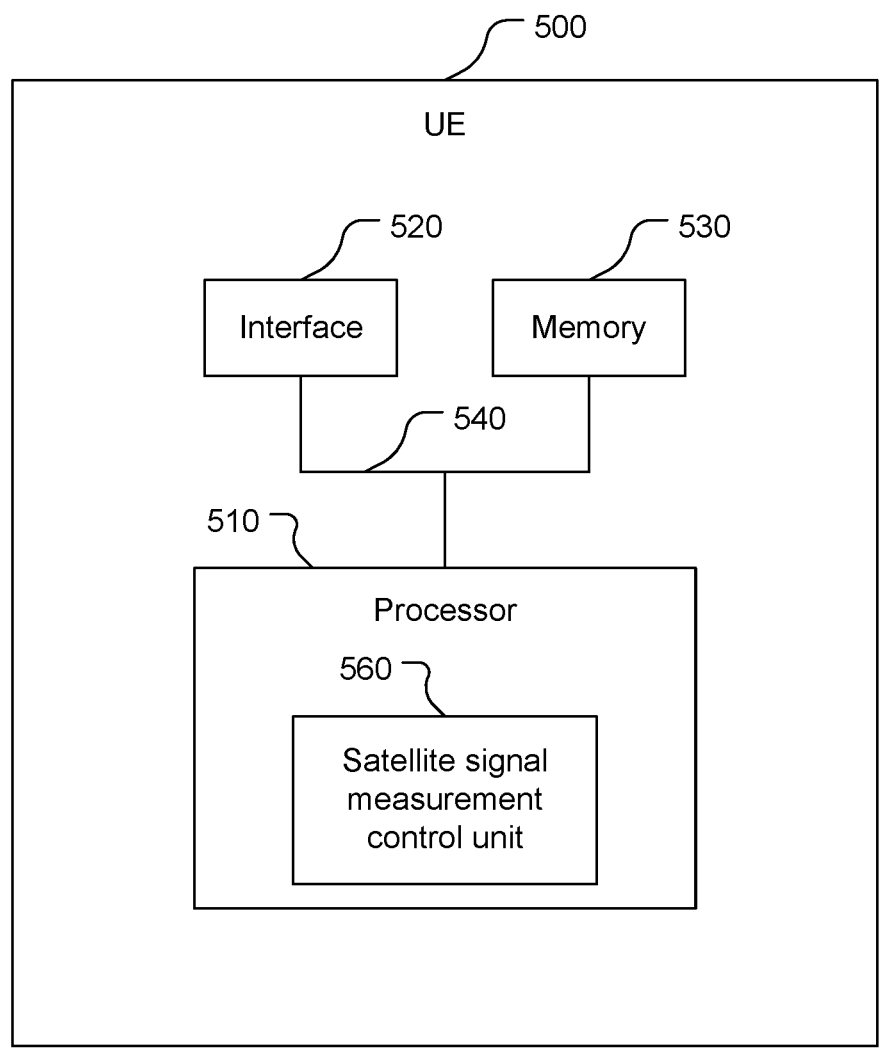
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a satellite signal measurement control unit 560. The satellite signal measurement control unit 560 may be configured to perform one or more functions for controlling activation status of receive chains of the UE 500 for measuring one or more satellite signals or disabling measurement of one or more satellite signals. Receive chains may be referred to as RF paths (radio frequency paths).

Figure 6:
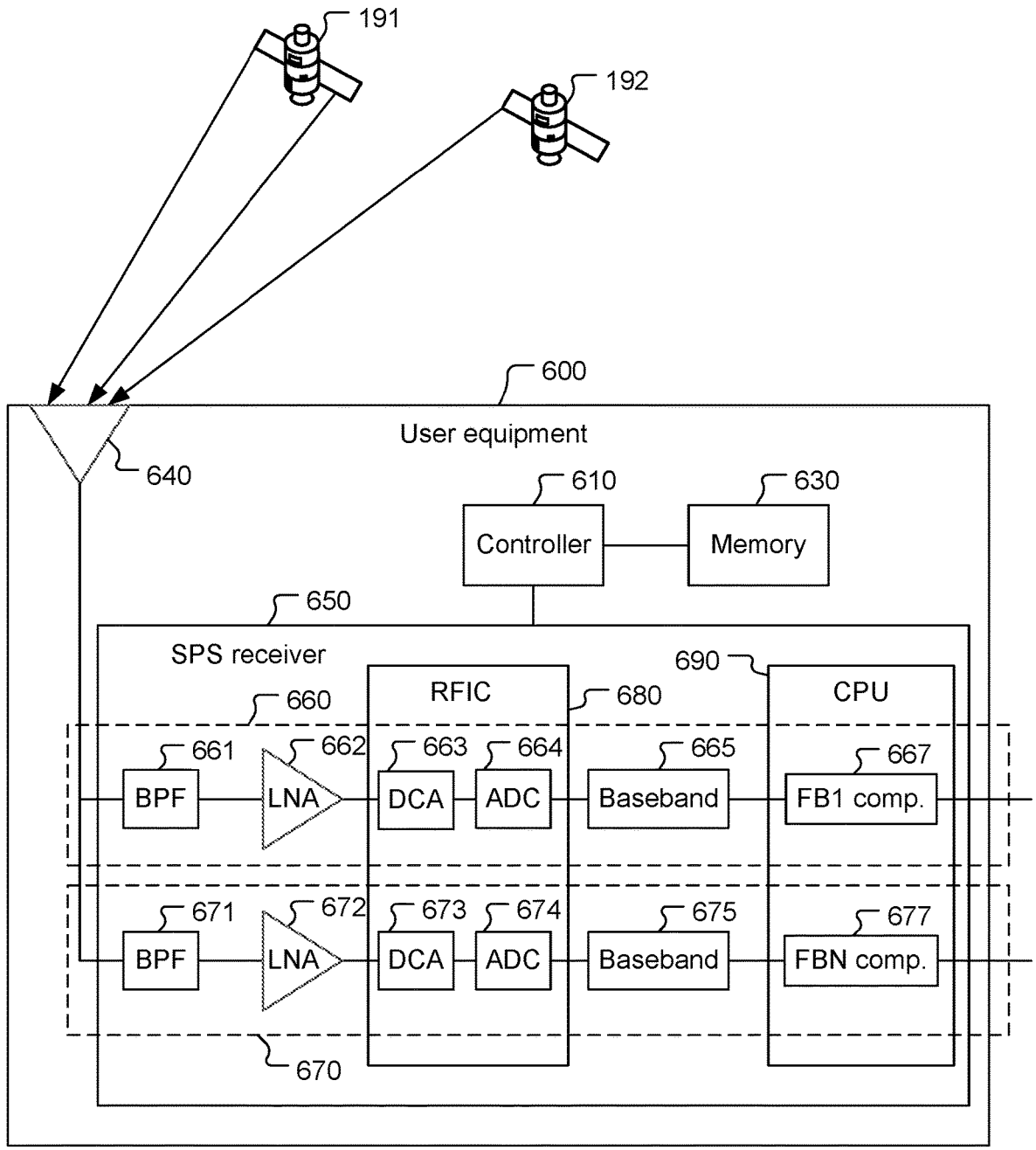
FIG. 6 is a block diagram of an example of the user equipment shown in FIG. 5.

Referring to FIG. 6, with further reference to FIGS. 1-5, a UE 600, which is an example of the UE 500, includes a controller 610, a memory 630, an antenna 640, and an SPS receiver 650 communicatively coupled to each other. The controller 610 may be an example of the satellite signal measurement control unit 560 and the memory 630 may be an example of the memory 530. The controller 610 may be implemented by the processor 510 and is configured to control components of the SPS receiver 650, e.g., activation status (whether a component (including a portion of a component) is active (e.g., powered or enabled for operation) or inactive (e.g., unpowered or disabled from operation)). The antenna 640 is configured to receive satellite signals of different frequency bands, and the antenna 640 may include one or more antennas and/or antenna elements.

The SPS receiver 650 includes multiple receive chains 660, 670 for measuring satellite signals. The satellite signals may have the same frequency or different frequencies, and/or may be in the same range of frequencies, in different but overlapping ranges of frequencies (with one or more shared frequencies), or in separate (non-overlapping) ranges of frequencies (with no shared frequency). The discussion herein refers to the receive chains 660, 670 being for different frequency bands, but this is an example and not limiting of the disclosure, including the claims. Further, while two receive chains are shown in FIG. 6, the UE 600 may include more than two receive chains, e.g., for measuring satellite signals having frequencies in more than two different frequency bands (e.g., different sub-bands). The receive chains 660, 670 may, for example, be configured to measure satellite signals in the L1 and L2/L5 bands, respectively, although this is an example and not limiting of the disclosure as either or both of the receive chains 660, 670 may be configured to measure signals of other frequencies or frequency bands, and/or other receive chains may be included in the UE 600.

The receive chain 660, 670 include respective components for measuring satellite signals, in this example, of different frequency bands. The receive chain 660 includes a BPF 661 (bandpass filter), an LNA 662 (low-noise amplifier), a DCA 663 (Digital Controlled Amplifier for downconversion, signal conditioning/filtering, and amplification), an ADC 664 (analog-to-digital converter), a baseband block 665, and a computational block 667. The BPF 661 is configured to pass signals of frequencies within a desired frequency band, e.g., the L1 band, with little if any attenuation, and to significantly attenuate signals of frequencies outside the desired frequency band of the BPF 661. The LNA 662 is configured to amplify signals passed by the BPF 661. The DCA 663 is configured to down convert the analog amplified signals output by the LNA 662 to a baseband frequency, to perform signal conditioning and/or filtering (e.g., anti-aliasing filtering), and amplification in addition to the amplification by the LNA 662. The ADC 664, which here is a portion of an RFIC 680 (Radio Frequency Integrated Circuit), is configured to convert the analog signals output by the DCA 663 into digital signals. The baseband block 665 is configured to perform intense signal processing of correlating the digital signals output by the ADC 664 with respective reference pseudorandom signals (e.g., Gold codes) by integrating the signals (e.g., for 1 ms) and dumping the integrated signals for further processing to determine whether the correlation results have sufficient energy to indicate a true signal. The computational block 667, which here is a portion of a CPU 690 (Central Processing Unit), is configured to perform one or more computations on the signals output by the baseband block 665 to determine one or more satellite signal parameters (e.g., pseudorange, CNo (carrier-to-noise-density ratio), Doppler, carrier phase, etc.). The computational block 667 comprises a portion of the CPU 690 for performing computations for the receive chain 660, namely corresponding to signals in the desired frequency band of the BPF 661. Thus, the computational block 667 is shown as being for computation for frequency band 1 (FB1). The CPU 690 may be a portion of the processor 510. The receive chain 670 includes a BPF 671, an LNA 672, a DCA 673, an ADC 674, a baseband block 675, and a computational block 677. The BPF 671 is configured to pass signals of frequencies within a desired frequency band, e.g., the L2/L5 band, with little if any attenuation, and to significantly attenuate signals of frequencies outside the desired frequency band of the BPF 671. The LNA 672, DCA 673, ADC 674, baseband block 675, and computational block 677 are configured similarly to the LNA 662, DCA 663, ADC 664, baseband block 665, and computational block 667, but configured, as appropriate, for processing signals corresponding to signals of the desired frequency of the BPF 671. Thus, the computational block 677 is shown as being for computation for frequency band N (FBN), as there may be N receive chains, with N being an integer of two or greater.

The receive chains 660, 670 are distinct and may be activated/deactivated independently. Although the DCAs 663, 673 and the ADCs 664, 674 are parts of the RFIC 680, the DCA 663 and the ADC 664 comprise a portion of the RFIC 680 and the DCA 673 and the ADC 674 comprise a different portion of the RFIC 690, e.g., such that the DCA 663 and the ADC 664 may be enabled/disabled independently of enablement/disablement of the DCA 673 and the ADC 674. Similarly, the computational block 667 comprises a portion of the CPU 690 and the computational block 677 comprises a different portion of the CPU 690 such that the computational blocks 667, 677 may be enabled/disabled independently. For example, processing by the computational block 667 may be performed while processing by the computational block 677 may be avoided, thus saving power that would be used to perform computations by the computational block 677. Each of the receive chains 660, 670 may be controlled by the controller 610 to be active, e.g., with the BPF 661, the LNA 662, the DCA 663, the ADC 664, the baseband block 665, and the computational block 667 powered and/or with the BPF 671, the LNA 672, the DCA 673, the ADC 674, the baseband block 675, and the computational block 677 powered. Similarly, each of the receive chains 660, 670 may be controlled by the controller 610 to be inactive, e.g., with one or more of the BPF 661, the LNA 662, the DCA 663, the ADC 664, the baseband block 665, and the computational block 667 not powered or otherwise not used (e.g., the computational block 667 not provided with data to process) and/or with one or more of the BPF 671, the LNA 672, the DCA 673, the ADC 674, the baseband block 675, and the computational block 677 not powered or otherwise not used.

The receive chains 660, 670 may have respective associated characteristics, e.g., due to different signal characteristics of the signals in the respective frequency bands that the receive chains 660, 670 are configured to measure. For example, the receive chain 670 may have a higher positioning accuracy than the receive chain 660 and the receive chain 660 may have a faster acquisition speed than the receive chain 670 with the receive chain 660 being associated with L1 signals and the receive chain 670 being associated with L5 signals that have a higher bandwidth than the L1 signals.

Which of the receive chains 660, 670 (and/or other receive chain) to activate and which of the receive chains 660, 670, if any, to inactivate may depend on a configured positioning performance of the UE 600 and/or detected satellite signal conditions. Positioning performance may include power consumption, positioning accuracy (achieved and/or desired (e.g., as indicated by user configuration)), acquisition speed (achieved and/or desired (e.g., as indicated by user configuration)), signal validation (e.g., for spoofing prevention, cross correlation prevention, acquiring satellites, cross checking acquired signals, etc.), and satellite signal conditions may include jamming (intentional or unintentional), signal spoofing, etc. For example, the activation status of the receive chains 660, 670 may depend on present power consumption of the receive chains 660, 670 and desired (e.g. configured) power consumption of the UE 600, one or more detected environmental conditions (e.g., signal conditions) such as whether one or more of the satellite signals is being jammed (intentionally or unintentionally), signal acquisition speeds of the satellite signals (e.g., due to bandwidths of the signals), positioning accuracy associated with the satellite signals (e.g., due to bandwidths of the signals, e.g., with larger bandwidths corresponding to higher time-domain resolution of arrival time measurements for the receiving operation and thus higher accuracy position estimates for the UE 600), etc. As further examples, which of the receive chains 660, 670 to activate may depend on one or more factors such as a user-entered configuration (e.g., desired positioning accuracy), a desired time to first fix (TTFF), a desired latency, etc. For example, different positioning requests and/or different positioning applications may have different corresponding latencies, desired TTFFs, desired positioning accuracies, etc. A receive chain may, for example, be inactivated based on the satellite signal corresponding to the receive chain not being able to provide a desired positioning performance (e.g., positioning accuracy and/or acquisition speed and/or latency). A receive chain may, as another example, be inactivated if another receive chain meets the desired positioning performance, or the benefit of using a specific receive chain is outweighed by the power consumed by that receive chain. For example, if an additional benefit (e.g., incremental positioning accuracy) of using a second receive chain in addition to using a first receive chain is outweighed by the power used by the second receive chain, then the second receive chain may be inactivated. Multiple factors may be considered for determining whether respective receive chains should be inactive or active. For example, if both high positioning accuracy and short acquisition time are desired, and a single receive chain or combination of receive chains cannot provide both desired positioning accuracy and desired acquisition speed, then a receive chain or combination of receive chains to be active may be determined without meeting both desired accuracy and acquisition speed, e.g., by prioritizing accuracy or speed, or determining a score (e.g., a weighted score) based on accuracy and speed provided by each path/combination of paths and activating the highest scoring path/combination of paths.

A user of the UE 600 may be able to configure the UE 600 dynamically for different operation. For example, the user may input data and/or establish one or more configurations through a user interface such as the user interface 216 which may be included in the interface 520. The user may be able to configure the UE 600, for example, for low-power operation, high-power operation, low-positioning-accuracy operation, or for high-positioning-accuracy operation. High-positioning accuracy may be about 1 m accuracy or even sub-1 m accuracy. The configuration of a positioning accuracy (and/or other positioning performance characteristics, e.g., acquisition speed, TTFF, etc.) may be explicitly requested by the user or implicitly requested by the user or another entity, e.g., by configuration of a software application and the software application has a corresponding desired positioning accuracy. Based on a configuration of a low-power mode, the controller 610 may activate the receive chain 660, 670 that uses less power to acquire and/or track a satellite signal. For example, the discussion herein uses an example implementation of the receive chain 660 being configured for L1 signal measurement and the receive chain 670 for L2/L5 signal measurement for illustrative purposes and not as a limitation to the disclosure. With this example implementation, based on a configuration of the low-power mode, the controller 610 may control the receive chain 660 to be active and the receive chain 670 to be inactive. The receive chain 660 may provide good TTF (time to fix) (e.g., less than 10 seconds) and good positioning accuracy (e.g., about 1 m or less). Continuing with the example implementation, the controller 610 may be configured such that based on the SPS receiver 650 having acquired a satellite signal with a good time and position uncertainty (e.g., using the receive chain 660), the controller may control the receive chain 670 to be active and the receive chain 660 to be inactive, to achieve good positioning accuracy with reasonable TTF (time to fix). This may help conserve power while providing desired positioning performance (e.g., TTFF, TTF, positioning accuracy, etc.). Good time uncertainty may be, for example, 1 µs or less, and good position uncertainty may be, for example, 2 m or less, and a reasonable TTF may be between about 3 s and about 10 s. The controller 610 may be configured to consider the user configuration(s) and one or more signal conditions in order to determine and control the activation status of the receive chains 660, 670, e.g., such that a receive chain of a jammed frequency band is inactive.

As another example of user configuration, a user may configure a high-positioning-accuracy mode, and the controller 610 may control the activation status of the receive chains 660, 670 accordingly. For example, to achieve high-precision positioning (e.g., sub-1 m such as decimeter-level or even centimeter-level accuracy) the controller 610 may cause both of the receive chains 660, 670 to be active, e.g., to achieve ongoing carrier phase on the frequencies of signals processed by both of the receive chains 660, 670 (e.g., L1 and L5 band) for faster integer ambiguity resolution and/or faster convergence for RTK (Real Time Kinematic) or PPP (Precise Point Positioning), respectively, compared to having one of the receive chains 660, 670 active and one of the receive chains 660, 670 inactive. As another example, once positioning using at least one of the receive chains 660, 670 has converged, the controller 610 may control the receive chains 660, 670 such that a receive chain corresponding to a converged position is active and the other receive chain is inactive (e.g., turned off). The controller 610 may reactivate the inactivated receive chain in response to the controller 610 determining to use the inactivated receive chain for integer ambiguity resolution or convergence, e.g., due to a determined integer ambiguity or lack of convergence without use of the inactivated receive chain.

The controller 610 may be configured to control the activation status of the receive chains 660, 670 (and/or one or more other receive chains) in a variety of manners based on the state of the UE 600 and one or more GNSS signal conditions. The controller 610 may control the activation status of the receive chains 660, 670 to attempt to maintain acceptable positioning accuracy and to conserve power. The controller 610 may, for example based on the time and position uncertainty being large, cause to be active (e.g., change from inactive to active, or remain in an active state) the receive chain 660, 670 corresponding to a satellite signal that has a shorter signal acquisition time, e.g., due to signal structure such as having fewer search hypotheses and/or having a smaller bandwidth, and cause the other receive chain 660, 670 to be inactive. This may help expedite signal acquisition, e.g., where the time and position uncertainty are high due to the UE 600 being turned off for a long time, while conserving power. Continuing the L1, L2/L5 band implementation example, the controller 610 may cause the receive chain 660 to be active and the receive chain 670 to be inactive, e.g., due to the L5 band signals (e.g., of GPS) to be acquired having 10 times more search hypotheses than the L1 band signals (e.g., of GPS) to be acquired and the L5 band signals having a bandwidth 10 times larger than the L1 band signals.

As another example, the controller 610 may control receive chain activation status based on time and position uncertainty being low. In this case, the controller 610 may cause to be active the receive chain 660, 670 corresponding to a satellite signal that has a higher associated positioning accuracy, e.g., due to signal structure such as having a larger bandwidth, and cause the other receive chain 660, 670 to be inactive. Time and position uncertainty may be maintained during ongoing operation and during durations while the UE 600 is off. At turn off of the receive chains 660, 670, the UE 600 has the time and position uncertainties and may use one or more models to estimate the time and position uncertainties over time while the receive chains 660, 670 are off. At turn on, if the estimated time and position uncertainties are within respective thresholds, then the controller 610 may cause the receive chain 660, 670 with higher positioning accuracy to be active and the other receive chain 660, 670 to be inactive. This may help maintain high positioning accuracy while conserving power, e.g., during open sky tracking conditions (where time and positioning uncertainty are typically low). Continuing the L1, L2/L5 implementation example, the controller 610 may cause the receive chain 670 to be active and the receive chain 660 to be inactive, e.g., due to the L5 signals (e.g., of GPS) to be measured having a bandwidth 10 times larger than the L1 signals.

The controller 610 may control the receive chain activation status of more than one receive chain, e.g., both of the receive chains 660, 670, to be active concurrently based on a state of the UE 600 and/or signal characteristics. For example, based on a signal having been acquired and a desire to validate the signal as a valid GNSS signal, the controller 610 may cause both of the receive chains 660, 670 to be active such that multiple signals are available for cross check of the acquired signal. Validation may be desired in various scenarios. For example, if a signal associated with one of the receive chains 660, 670 is susceptible to cross correlation (e.g., due to having a short code length (e.g., L1 signals may have much shorter code lengths than L5 signals), then an acquired signal may be validated to ensure that the acquired signal is not a cross-correlation signal. Using the example implementation, the controller 610 may cause both of the receive chains 660, 670 to be active in order to use an L5 signal from the same satellite as an L1 signal (where the L5 signal has better cross-correlation properties than the L1 signal) to validate that the L1 signal is not a cross-correlation signal. As another example, the controller 610 may cause both of the receive chains 660, 670 to be active based on a suspicion that a signal is spoofed. For example, if an L1 signal is acquired or tracked using the receive chain 660, then the receive chain 670 may be caused to be active and an L5 signal measured by the receive chain 670 compared with the L1 signal. If the L1 and L5 signals are consistent (e.g., yield a similar pseudorange), then the UE 600 (e.g., the processor 510) may conclude that the L1 signal is not spoofed because spoofing both signals (e.g., to appear to be from the same satellite, e.g., to have a similar pseudorange) is much more difficult than spoofing one signal. If a satellite is tracked using a signal (for which validation is desirable, e.g., that may be spoofed) from one of the receive chains 660, 670 that is active and not the other receive chain 660, 670 that is inactive, e.g., an L1 signal from the receive chain 660, then the controller 610 may cause both of the receive chains 660, 670 to be active concurrently to perform a cross check on the tracking signal and then returned to being inactive. As another example, if a signal is tracked from one of the receive chains 660, 670 that is active and not the other receive chain 660, 670 that is inactive, e.g., an L5 signal from the receive chain 670, then the controller 610 may cause both of the receive chains 660, 670 to be active concurrently to acquire one or more non-tracked satellites based on a signal of the previously-inactive receive chain being more efficient to use for acquiring satellites, e.g., given a current position uncertainty and time uncertainty of the UE 600. After one or more satellites are acquired, or after elapsing of a threshold time without acquiring a satellite, the previously-inactive receive chain may be returned to inactive status (e.g., one or more components (e.g., an LNA or a computational block) of the previously-inactive receive chain power off). To cause a receive chain to be inactive, the controller 610 may turn OFF (e.g., prevent power from reaching or prevent operation of) a computational block to make a receive chain inactive while keeping components of the receive chain for acquiring a signal ON in order to avoid having to re-lock to a signal. Power may be reduced, e.g., by turning off position estimation using a signal without turning off reception of that signal, to conserve power while continuing lock to a signal such that re-locking to the signal may be avoided.

The controller 610 may control the receive chain activation status of more than one receive chain, e.g., both of the receive chains 660, 670, to be active concurrently based on soft handover of satellite tracking. For example, if the receive chain 660 is being used to measure a satellite signal for tracking a particular satellite, and a change is to be made to using the receive chain 670 to measure a satellite signal for tracking the particular satellite, then the controller 610 may activate the receive chain 670 while the receive chain 660 is still active. One or more signal parameters (e.g., frequency offset, time offset, Doppler, etc.) corresponding to the signal measurement by the receive chain 660 may be used to help acquire the signal measured by the receive chain 670. Once the signal is acquired by the receive chain 670, the controller may deactivate the receive chain 660.

During satellite signal tracking and based on present environmental conditions, one or more satellite signals may be intentionally or unintentionally jammed. A signal may be intentionally jammed, for example, by a device configured and disposed to simulate a satellite. A satellite signal may be unintentionally jammed by a signal transmitted for a purpose other than jamming a satellite signal but that overlaps in frequency with the satellite signal and is of enough power when received to interfere with measurement (e.g., impede accurate measurement) of the satellite signal. The UE 600 may jam signals by transmitting a signal that is received by the UE 600 and interferes with (e.g., overwhelms) a received satellite signal. The UE 600 may detect presence of a jamming signal (e.g., using a known technique employing decimation and/or frequency translation) and control the receive chains 660, 670 to cause the receive chain 660, 670 that is jammed to be inactive and to cause the receive chain 660, 670, if any, that is not jammed to be active. Having the receive chain 660, 670 of the jammed signal be inactive can, relative to having this receive chain active, save power and improve positioning accuracy because using a jammed satellite signal will likely decrease measurement accuracy and thus decrease positioning accuracy. The controller 610 may intermittently (e.g., periodically) activate the receive chain 660, 670 of the jammed signal to determine whether the jamming is still present. If the jamming is still present, then the controller 610 may return the receive chain 660, 670 to the inactive state. If the jamming is not present, then the controller 610 may proceed to control the activation status of the receive chains 660, 670 based on one or more other factors, e.g., as discussed herein.

The controller 610 may control the activation status of both of the receive chains 660, 670 to be active in order to determine atmospheric delay (e.g., ionospheric delay). For example, in response to a request (e.g., from an application) to determine atmospheric delay, the controller 610 may cause both of the receive chains 660, 670 to be active. This will help the UE 600 determine atmospheric delay, and known the atmospheric delay may help improve positioning accuracy. Because ionospheric delay changes slowly, once ionospheric delay is determined, if steady-state operation (e.g., satellite tracking) with acceptable quality of service may proceed without both of the receive chains 660, 670 active, then the controller 610 may cause the receive chain 660, 670 that is not to be used for steady-state operation to be inactive. This may help save power while maintaining performance, e.g., satellite tracking, positioning accuracy. The inactivated receive chain 660, 670 may be reactivated by the controller 610 intermittently (e.g., periodically based on a timer, aperiodically in response to a request, semi-persistently (periodically in response to an aperiodic request), etc.) in order to re-determine atmospheric delay. A periodicity of reactivated a deactivated receive chain to re-determine atmospheric delay may depend on implementation and/or one or more conditions such as time of day, sun spot activity, how the SPS receiver 650 reacts to atmospheric delay, etc. The controller 610 may, for example, reactivate a deactivated receive chain every few hours (e.g., every 6-8 hours) or more frequently, e.g., every 10 minutes or even more often.

Figure 7:
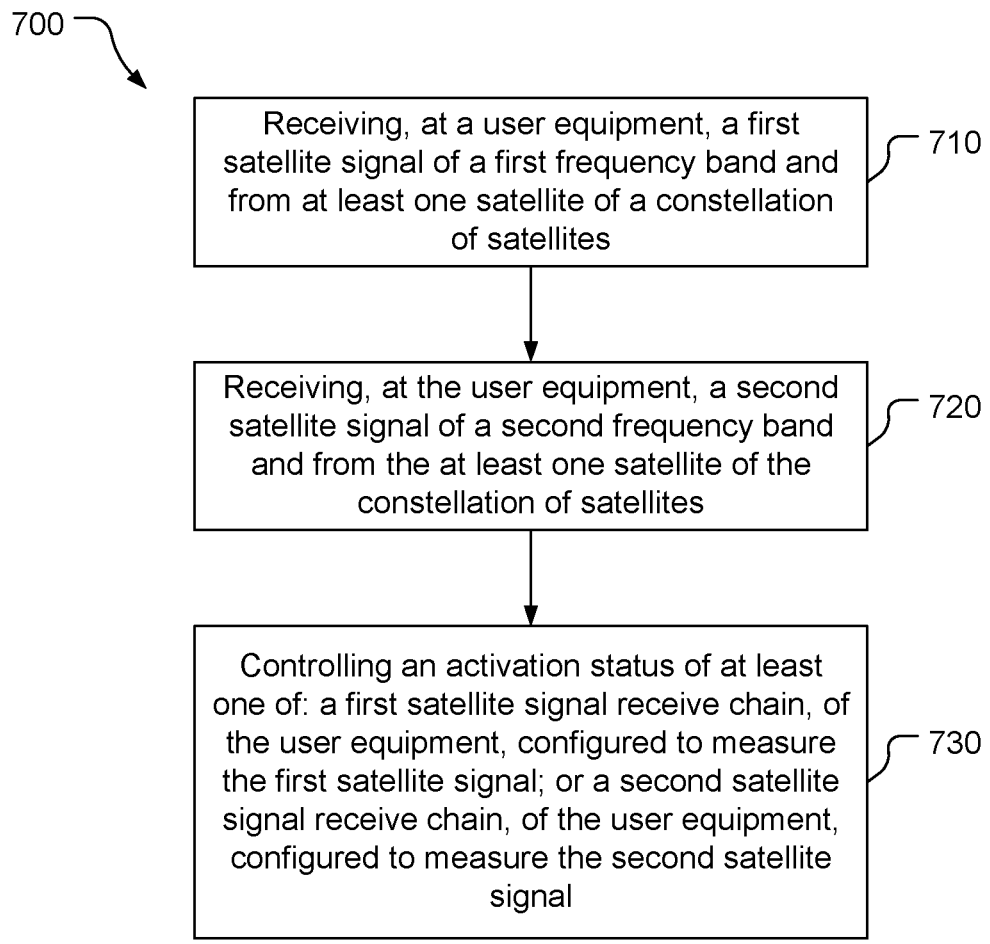
FIG. 7 is a block flow diagram of a satellite signal processing method.

Referring to FIG. 7, with further reference to FIGS. 1-6, a satellite signal processing method 700 includes the stages shown. The method 700 is, however, an example only and not limiting. The method 700 may be altered, e.g., by having stages added, removed, rearranged, combined, performed concurrently, and/or having single stages split into multiple stages. Examples are provided below for receiving L1 and L5 signals, but the disclosure is not limited to these frequency bands and is not limited to receiving (or measuring) two satellite signal (also called SV signals).

At stage 710, the method 700 includes receiving, at a user equipment, a first satellite signal of a first frequency band and from at least one satellite of a constellation of satellites. For example, the receive chain 660 receives, via the antenna 640, a first SV signal from a satellite in a constellation, with the first SV signal having a first frequency, e.g., one or more frequencies in a frequency band, e.g., the L1 band. For example, the receive chain 660 of the UE 310 receives the satellite signal 341 from the satellite 190. The receive chain 660, or a portion thereof (e.g., the BPF 661), and the antenna 640 may comprise means for receiving the first satellite signal. Other components of the receive chain 660 may or may not comprise portions of the means for receiving the first satellite signal. For example, components downstream of an inactive component may not comprise portions of the means for receiving the first satellite signal.

At stage 720, the method 700 includes receiving, at the user equipment, a second satellite signal of a second frequency band and from the at least one satellite of the constellation of satellites. For example, the receive chain 670 receives, via the antenna 640, a second SV signal from a satellite in the same constellation as that from which the first SV signal is received (possibly the same satellite), with the second SV signal having a second frequency, e.g., one or more frequencies in a frequency band, e.g., the L5 band. The first frequency may be the same as or different from the second frequency. For example, the first and second frequencies may be in first and second ranges of frequency and the first and second ranges of frequency may be the same, may be different but overlapping, or may be separate (i.e., non-overlapping (no shared frequency(ies))). The receive chain 670 of the UE 310 may, for example, receive the satellite signal 342 from the satellite 190 and/or the satellite signal 343 from the satellite 192. The receive chain 670, or a portion thereof (e.g., the BPF 671), and the antenna 640 may comprise means for receiving the second satellite signal. Similar to the discussion of stage 710, other components of the receive chain 670 may or may not comprise portions of the means for receiving the second satellite signal.

At stage 730, the method 700 includes controlling an activation status of at least one of: a first satellite signal receive chain, of the user equipment, configured to measure the first satellite signal; or a second satellite signal receive chain, of the user equipment, configured to measure the second satellite signal. For example, the controller 610 may control the receive chains 660, 670 (and/or one or more other receive chains) to be active or inactive, respectively, such that both of the receive chains 660, 670 may be active concurrently, or inactive concurrently, or such that one of the receive chains 660, 670 is active while the other receive chain 660, 670 is inactive (with at least one component being inactive, e.g., powered OFF (e.g., not receiving power)). The controller 610, possibly in combination with the memory 630 (e.g., the processor 510, possibly in combination with the memory 530), may comprise means for controlling an activation status of at least one of the first receive chain or the second receive chain.

Implementations of the method 700 may include one or more of the following features. In an example implementation, referring also to FIG. 8, a stage 830 is an example of the stage 730. At stage 830, controlling the activation status comprises controlling the activation status of the at least one of the first satellite signal receive chain or the second satellite signal receive chain based on a configured positioning performance of the user equipment, or a detected satellite signal condition, or a combination thereof. For example, the controller 610 may control the active/inactive status of the receive chains 660, 670 based on a configured positioning performance (e.g., a configuration or setting of positioning accuracy, signal acquisition speed, signal validation desire, atmospheric delay determination desire, soft handoff of satellite tracking, etc.) and/or a detected satellite signal condition (e.g., signal jamming, signal spoofing). In a further example implementation, referring also to FIG. 9, a stage 930 is an example of the stage 830. At stage 930, controlling the activation status comprises controlling the activation status of the at least one of the first satellite signal receive chain or the second satellite signal receive chain based on at least one of a positioning accuracy and/or a signal acquisition speed.

Also or alternatively, implementations of the method 700 may include one or more of the following features. In an example implementation, referring also to FIG. 10, a stage 1030 is an example of the stage 730. At stage 1030, controlling the activation status comprises controlling the first satellite signal receive chain to be active in response to receiving a request to acquire a third satellite signal from the at least one satellite of the constellation of satellites, wherein the first satellite signal has at least one of fewer associated search hypotheses than the second satellite signal or a smaller bandwidth than the second satellite signal. For example, the controller 610 may cause the receive chain 660 to be active in order to acquire a presently-unacquired signal based on the SV signal corresponding to the receive chain 660 having fewer search hypotheses and/or a smaller bandwidth than the SV signal corresponding to the receive chain 670, and thus being quicker (on average) to acquire. In a further example implementation, referring also to FIG. 11, a stage 1130 is an example of the stage 1030. At stage 1130, controlling the activation status comprises controlling an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal. For example, the controller 610 may cause the receive chain 660, if for L1 signals, to be active and the receive chain 670, if for L5 signals, to be inactive, if the time and/or position uncertainty are high.

Also or alternatively, implementations of the method 700 may include one or more of the following features. In an example implementation, referring also to FIG. 12, a stage 1230 is an example of the stage 730. At stage 1230, controlling the activation status comprises controlling the second satellite signal receive chain to be active, and at least one component of the first satellite signal receive chain to be inactive, in response to receiving a request to track the at least one satellite of the constellation of satellites with the second satellite signal, wherein the first satellite signal has a smaller bandwidth than the second satellite signal. For example, the controller 610 may cause the receive chain 670, if for L5 signals, to be active and the receive chain 660, if for L1 signals, to be inactive, e.g., due to the L5 signals to be measured having a bandwidth larger than the L1 signals and a request being received to track a satellite using an L5 signal. In a further example implementation, referring also to FIG. 13, a stage 1330 is an example of the stage 1230. At stage 1330, controlling the activation status comprises controlling the second satellite signal receive chain to be active, and the at least one component of the first satellite signal receive chain to be inactive, based on determining that a time uncertainty of the user equipment is below aa time uncertainty threshold and a position uncertainty of the user equipment is below a position uncertainty threshold. For example, the controller 610 may cause the receive chain 670, if for L5 signals, to be active and the receive chain 660, if for L1 signals, to be inactive based further on time and position uncertainties of the UE 600 being below respective thresholds, e.g., and thus further signal acquisition (using the receive chain 660) avoided, thus saving power.

Also or alternatively, implementations of the method 700 may include one or more of the following features. In an example implementation, referring also to FIG. 21, a stage 2130 is an example of the stage 730. At stage 2130, controlling the activation status comprises controlling, while the first satellite signal receive chain is active, the second satellite signal receive chain to become active, and then controlling the first satellite signal receive chain to become inactive in response to receiving a request to track the at least one satellite signal of the constellation of satellites with the second satellite signal. For example, the controller 610 can control the receive chains 660, 670 for soft handoff from tracking one SV to tracking another SV based on a request to track the other SV using another SV signal corresponding to the other SV. In a further example implementation, referring also to FIG. 22, the method 700 may include stage 2200 of using one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active. For example, the processor 510 may use one or more parameters such as frequency offset, time offset, and/or Doppler determined from using one SV signal measured by one of the receive chains 660, 670 to acquire and measure an SV signal by the other of the receive chains 660, 670.

Also or alternatively, implementations of the method 700 may include one or more of the following features. In an example implementation, referring also to FIG. 14, a stage 1430 is an example of the stage 730. At stage 1430, controlling the activation status comprises controlling the activation status of the first satellite signal receive chain to be active, and the activation status of the second satellite signal receive chain to be active, in response to receiving a request to validate an acquired satellite signal from the at least one satellite of the constellation of satellites. In a further example implementation, referring also to FIG. 15, a stage 1530 is an example of the stage 1430. At stage 1530, controlling the activation status comprises controlling an activation status of at least one component of the second satellite signal receive chain to be inactive in response to validation of the acquired satellite signal. In another further example implementation, referring also to FIG. 16, a stage 1630 is another example of the stage 1430. At stage 1630, controlling the activation status comprises controlling, periodically, the second satellite signal receive chain to be active, while the first satellite signal receive chain is active and in response to receiving the request to validate the acquired satellite signal, to validate the acquired satellite signal. For example, the controller 610 may periodically activate the receive chain 670, the processor 510 may attempt to validate the acquired signal, and the controller 610 may deactivate the receive chain 670 (e.g., after validation or after expiration of a threshold time without validation of the acquired signal).

Also or alternatively, implementations of the method 700 may include one or more of the following features. In an example implementation, referring also to FIG. 17, a stage 1730 is an example of the stage 730. At stage 1730, controlling the activation status comprises controlling the first satellite signal receive chain to be active, and the second satellite signal receive chain to be active, in response to receiving a request to determine an ionospheric delay from the at least one satellite of the constellation of satellites. For example, as discussed above, the controller 610 may cause multiple receive chains, e.g., the receive chains 660, 670, to be active concurrently such that measurements of multiple satellites signals may be used, e.g., by the processor 510, to determine ionospheric delay. In a further example implementation, referring also to FIG. 18, a stage 1830 is an example of the stage 1730. At stage 1830, controlling the activation status comprises controlling, periodically, the second satellite signal receive chain to be active while the first satellite signal receive chain is active and in response to receiving the request to determine the ionospheric delay. For example, the controller 610 may periodically cause both of the receive chains 660, 670 to be active, then cause one of the receive chains 660, 670 to be inactive, e.g., to conserve power, then later again cause both of the receive chains 660, 670 to be active based on the initial (or a later) request to determine ionospheric delay. This may help keep the ionospheric delay updated, and thus help maintain positioning accuracy, while conserving power.

Also or alternatively, implementations of the method 700 may include one or more of the following features. In an example implementation, referring also to FIG. 19, a stage 1930 is an example of the stage 730. At stage 1930, controlling the activation status comprises controlling at least one of the first satellite signal receive chain to be active, or the second satellite signal receive chain to be active, or a combination thereof, based on: signal acquisition speeds associated with acquiring the first satellite signal and acquiring the second satellite signal, and a desired satellite signal acquisition speed; or position accuracy associated with the first satellite signal and the second satellite signal, and a desired position accuracy; or a combination thereof. For example, as discussed above, the controller 610 may cause one or both of the receive chains 660, 670 to be active based on the respective acquisition speeds associated with SV signals corresponding to the receive chains 660, 670 (and possibly a desired acquisition speed), and/or based on the respective position accuracies associated with the SV signals corresponding to the receive chains 660, 670 (and possibly a desired positioning accuracy). In another example implementation, referring also to FIG. 20, a stage 2030 is an example of the stage 730. At stage 2030, controlling the activation status comprises controlling, in response to detection of jamming of the first satellite signal, at least one component of the first satellite signal receive chain to be inactive and the second satellite signal receive chain to be active. For example, the processor 510 may detect jamming of a signal, and the controller 610, in response to the jamming detection, may cause a corresponding one of the receive chains 660, 670 to be inactive (by having at least one component inactive) and the other of the receive chains 660, 670 to be active.

IMPLEMENTATION EXAMPLES

Implementation examples are provided in the following numbered clauses.

Clause 1. A user equipment comprising:
a memory;
a controller communicatively coupled to the memory; and
a satellite positioning system receiver communicatively coupled to the controller and comprising:
a first satellite signal receive chain configured to receive a first satellite signal, of a first frequency band, from at least one satellite of a constellation of satellites; and
a second satellite signal receive chain configured to measure a second satellite signal, of a second frequency band, from the at least one satellite of the constellation of satellites;
wherein the controller is configured to control an activation status of at least one of the first satellite signal receive chain or the second satellite signal receive chain.

Clause 2. The user equipment of clause 1, wherein the controller is configured to control the activation status of the at least one of the first satellite signal receive chain or the second satellite signal receive chain based on a configured positioning performance of the user equipment, or a detected satellite signal condition, or a combination thereof.

Clause 3. The user equipment of clause 2, wherein the configured positioning performance of the user equipment comprises at least one of a positioning accuracy or a signal acquisition speed.

Clause 4. The user equipment of clause 1, wherein the first satellite signal has at least one of fewer associated search hypotheses than the second satellite signal or a smaller bandwidth than the second satellite signal, and wherein the controller is configured to control the first satellite signal receive chain to be active in response to receiving a request to acquire a third satellite signal from the at least one satellite of the constellation of satellites.

Clause 5. The user equipment of clause 4, wherein the controller is configured to control an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal.

Clause 6. The user equipment of clause 1, wherein the first satellite signal has a smaller bandwidth than the second satellite signal, and wherein the controller is configured to control the second satellite signal receive chain to be active, and at least one component of the first satellite signal receive chain to be inactive, in response to receiving a request to track the at least one satellite of the constellation of satellites with the second satellite signal.

Clause 7. The user equipment of clause 6, wherein the controller is configured to control the second satellite signal receive chain to be active, and the at least one component of the first satellite signal receive chain to be inactive, based on determining that a time uncertainty of the user equipment is below a time uncertainty threshold and a position uncertainty of the user equipment is below a position uncertainty threshold.

Clause 8. The user equipment of clause 1, wherein the controller is configured to control, while the first satellite signal receive chain is active, the second satellite signal receive chain to become active, and then to control the first satellite signal receive chain to become inactive in response to receiving a request to track the at least one satellite of the constellation of satellites with the second satellite signal.

Clause 9. The user equipment of clause 8, further comprising a processor communicatively coupled to the satellite positioning system receiver and configured to use one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active.

Clause 10. The user equipment of clause 1, wherein the controller is configured to control the activation status of the first satellite signal receive chain to be active, and the activation status of the second satellite signal receive chain to be active, in response to receiving a request to validate an acquired satellite signal from the at least one satellite of the constellation of satellites.

Clause 11. The user equipment of clause 10, wherein the controller is configured to control an activation status of at least one component of the second satellite signal receive chain to be inactive in response to validation of the acquired satellite signal.

Clause 12. The user equipment of clause 10, wherein the controller is configured to control, periodically, the second satellite signal receive chain to be active, while the first satellite signal receive chain is active and in response to receiving the request to validate the acquired satellite signal, to validate the acquired satellite signal.

Clause 13. The user equipment of clause 1, wherein the controller is configured to control the first satellite signal receive chain to be active, and the second satellite signal receive chain to be active, in response to receiving a request to determine an ionospheric delay from the at least one satellite of the constellation of satellites.

Clause 14. The user equipment of clause 13, wherein the controller is configured to control, periodically, the second satellite signal receive chain to be active while the first satellite signal receive chain is active and in response to receiving the request to determine the ionospheric delay.

Clause 15. The user equipment of clause 1, wherein the controller is configured to control at least one of the first satellite signal receive chain to be active, or the second satellite signal receive chain to be active, or a combination thereof, based on:

signal acquisition speeds associated with acquiring the first satellite signal and acquiring the second satellite signal, and a desired satellite signal acquisition speed; or position accuracy associated with the first satellite signal and the second satellite signal, and a desired position accuracy; or a combination thereof.

Clause 16. The user equipment of clause 1, wherein the controller is configured to control, in response to detection of jamming of the first satellite signal, at least one component of the first satellite signal receive chain to be inactive and the second satellite signal receive chain to be active.

Clause 17. A satellite signal processing method comprising:

receiving, at a user equipment, a first satellite signal of a first frequency band from at least one satellite of a constellation of satellites;

receiving, at the user equipment, a second satellite signal of a second frequency band and from the at least one satellite of the constellation of satellites; and controlling an activation status of at least one of: a first satellite signal receive chain, of the user equipment, configured to measure the first satellite signal; or a second satellite signal receive chain, of the user equipment, configured to measure the second satellite signal.

Clause 18. The satellite signal processing method of clause 17, wherein controlling the activation status comprises controlling the activation status of the at least one of the first satellite signal receive chain or the second satellite signal receive chain based on a configured positioning performance of the user equipment, or a detected satellite signal condition, or a combination thereof.

Clause 19. The satellite signal processing method of clause 18, wherein the configured positioning performance of the user equipment comprises at least one of a positioning accuracy or a signal acquisition speed.

Clause 20. The satellite signal processing method of clause 17, wherein the first satellite signal has at least one of fewer associated search hypotheses than the second satellite signal or a smaller bandwidth than the second satellite signal, and wherein controlling the activation status comprises controlling the first satellite signal receive chain to be active in response to receiving a request to acquire a third satellite signal from the at least one satellite of the constellation of satellites.

Clause 21. The satellite signal processing method of clause 20, wherein controlling the activation status comprises controlling an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal.

Clause 22. The satellite signal processing method of clause 17, wherein the first satellite signal has a smaller bandwidth than the second satellite signal, and wherein controlling the activation status comprises controlling the second satellite signal receive chain to be active, and at least one component of the first satellite signal receive chain to be inactive, in response to receiving a request to track the at least one satellite of the constellation of satellites with the second satellite signal.

Clause 23. The satellite signal processing method of clause 22, wherein controlling the activation status comprises controlling the second satellite signal receive chain to be active, and the at least one component of the first satellite signal receive chain to be inactive, based on determining that a time uncertainty of the user equipment is below a time uncertainty threshold and a position uncertainty of the user equipment is below a position uncertainty threshold.

Clause 24. The satellite signal processing method of clause 17, wherein controlling the activation status comprises, while the first satellite signal receive chain is active, controlling the second satellite signal receive chain to become active, and then controlling the first satellite signal receive chain to become inactive in response to receiving a request to track the at least one satellite of the constellation of satellites with the second satellite signal.

Clause 25. The satellite signal processing method of clause 24, further comprising using one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active.

Clause 26. The satellite signal processing method of clause 17, wherein controlling the activation status comprises controlling the activation status of the first satellite signal receive chain to be active, and the activation status of the second satellite signal receive chain to be active, in response to receiving a request to validate an acquired satellite signal from the at least one satellite of the constellation of satellites.

Clause 27. The satellite signal processing method of clause 26, wherein controlling the activation status comprises controlling an activation status of at least one component of the second satellite signal receive chain to be inactive in response to validation of the acquired satellite signal.

Clause 28. The satellite signal processing method of clause 26, wherein controlling the activation status comprises controlling, periodically, the second satellite signal receive chain to be active, while the first satellite signal receive chain is active and in response to receiving the request to validate the acquired satellite signal, to validate the acquired satellite signal.

Clause 29. The satellite signal processing method of clause 17, wherein controlling the activation status comprises controlling the first satellite signal receive chain to be active, and the second satellite signal receive chain to be active, in response to receiving a request to determine an ionospheric delay from the at least one satellite of the constellation of satellites.

Clause 30. The satellite signal processing method of clause 29, wherein controlling the activation status comprises controlling, periodically, the second satellite signal receive chain to be active while the first satellite signal receive chain is active and in response to receiving the request to determine the ionospheric delay.

Clause 31. The satellite signal processing method of clause 17, wherein controlling the activation status comprises controlling at least one of the first satellite signal receive chain to be active, or the second satellite signal receive chain to be active, or a combination thereof, based on:

signal acquisition speeds associated with acquiring the first satellite signal and acquiring the second satellite signal, and a desired satellite signal acquisition speed; or position accuracy associated with the first satellite signal and the second satellite signal, and a desired position accuracy; or a combination thereof.

Clause 32. The satellite signal processing method of clause 17, wherein controlling the activation status comprises controlling, in response to detection of jamming of the first satellite signal, at least one component of the first satellite signal receive chain to be inactive and the second satellite signal receive chain to be active.

Clause 33. A user equipment comprising:

means for measuring a first satellite signal of a first frequency band from at least one satellite of a constellation of satellites;

means for measuring a second satellite signal of a second frequency band and from the at least one satellite of the constellation of satellites; and means for controlling an activation status of at least one of the means for measuring the first satellite signal or the means for measuring the second satellite signal.

Clause 34. The user equipment of clause 33, wherein the means for controlling comprise means for controlling the activation status of the at least one of the means for measuring the first satellite signal or the means for measuring the second satellite signal based on a configured positioning performance of the user equipment, or a detected satellite signal condition, or a combination thereof.

Clause 35. The user equipment of clause 34, wherein the configured positioning performance of the user equipment comprises at least one of a positioning accuracy or a signal acquisition speed.

Clause 36. The user equipment of clause 33, wherein the first satellite signal has at least one of fewer associated search hypotheses than the second satellite signal or a smaller bandwidth than the second satellite signal, and wherein the means for controlling the activation status comprises means for controlling the means for measuring the first satellite signal to be active in response to receiving a request to acquire a third satellite signal from the at least one satellite of the constellation of satellites.

Clause 37. The user equipment of clause 36, wherein the means for controlling the activation status comprises means for controlling an activation status of at least one component of the means for measuring the second satellite signal to be inactive based on at least one of a time uncertainty being above a time uncertainty threshold associated with the second satellite signal or a position uncertainty of the user equipment being above a position uncertainty threshold associated with the second satellite signal.

Clause 38. The user equipment of clause 33, wherein the first satellite signal has a smaller bandwidth than the second satellite signal, and wherein the means for controlling the activation status comprises means for controlling the means for measuring the second satellite signal to be active, and at least one component of the means for measuring the first satellite signal to be inactive, in response to receiving a request to track the at least one satellite of the constellation of satellites with the second satellite signal.

Clause 39. The user equipment of clause 38, wherein the means for controlling the activation status comprise means for controlling the second satellite signal receive chain to be active, and the at least one component of the first satellite signal receive chain to be inactive, based on determining that a time uncertainty of the user equipment is below a time uncertainty threshold and a position uncertainty of the user equipment is below a position uncertainty threshold.

Clause 40. The user equipment of clause 33, wherein the means for controlling the activation status comprise means for controlling, while the means for measuring the first satellite signal are active, the means for measuring the second satellite signal to become active, and means for then controlling the means for measuring the first satellite signal to become inactive in response to receiving a request to track the at least one satellite of the constellation of satellites with the second satellite signal.

Clause 41. The user equipment of clause 40, further comprising means for using one or more obtained satellite signal tracking parameters, corresponding to the first satellite signal from the at least one satellite of the constellation of satellites, to track the at least one satellite of the constellation of satellites with the second satellite signal while both the means for measuring the first satellite signal and the means for measuring the second satellite signal are active.

Clause 42. The user equipment of clause 33, wherein the means for controlling the activation status comprises means for controlling the activation status of the means for measuring the first satellite signal to be active, and the activation status of the means for measuring the second satellite signal to be active, in response to receiving a request to validate an acquired satellite signal from the at least one satellite of the constellation of satellites.

Clause 43. The user equipment of clause 42, wherein the means for controlling the activation status comprises means for controlling an activation status of at least one component of the means for measuring the second satellite signal to be inactive in response to validation of the acquired satellite signal.

Clause 44. The user equipment of clause 42, wherein the means for controlling the activation status comprises means for controlling, periodically, the means for measuring the second satellite signal to be active, while the means for measuring the first satellite signal are active and in response to receiving the request to validate the acquired satellite signal, to validate the acquired satellite signal.

Clause 45. The user equipment of clause 33, wherein the means for controlling the activation status comprises means for controlling the means for measuring the first satellite signal to be active, and the means for measuring the second satellite signal to be active, in response to receiving a request to determine an ionospheric delay from the at least one satellite of the constellation of satellites.

Clause 46. The user equipment of clause 45, wherein the means for controlling the activation status comprises means for controlling, periodically, the means for measuring the second satellite signal to be active while the means for measuring the first satellite signal are active and in response to receiving the request to determine the ionospheric delay.

Clause 47. The user equipment of clause 33, wherein the means for controlling the activation status comprises means for controlling at least one of the means for measuring the first satellite signal to be active, or the means for measuring the second satellite signal to be active, or a combination thereof, based on:
signal acquisition speeds associated with acquiring the first satellite signal and acquiring the second satellite signal, and a desired satellite signal acquisition speed; or
position accuracy associated with the first satellite signal and the second satellite signal, and a desired position accuracy; or
a combination thereof.

Clause 48. The user equipment of clause 33, wherein the means for controlling the activation status comprises means for controlling, in response to detection of jamming of the first satellite signal, at least one component of the means for measuring the first satellite signal to be inactive and the means for measuring the second satellite signal to be active.

Clause 49. A non-transitory, processor-readable storage medium comprising processor-readable instructions to cause a processor of a user equipment to:
control an activation status of at least one of a first satellite signal receive chain of the user equipment or a second satellite signal receive chain of the user equipment;
wherein the first satellite signal receive chain is configured to measure a first satellite signal, of a first frequency band, from at least one satellite of a constellation of satellites; and
wherein the second satellite signal receive chain is configured to measure a second satellite signal, of a second frequency band and from the at least one satellite of the constellation of satellites.

Clause 50. The storage medium of clause 49, wherein the processor-readable instructions to cause the processor to control the activation status comprise processor-readable instructions to cause the processor to control the activation status of the at least one of the first satellite signal receive chain or the second satellite signal receive chain based on a configured positioning performance of the user equipment, or a detected satellite signal condition, or a combination thereof.

Clause 51. The storage medium of clause 50, wherein the configured positioning performance of the user equipment comprises at least one of a positioning accuracy or a signal acquisition speed.

Clause 52. The storage medium of clause 49, wherein the first satellite signal has at least one of fewer associated search hypotheses than the second satellite signal or a smaller bandwidth than the second satellite signal, and wherein the processor-readable instructions to cause the processor to control the activation status comprise processor-readable instructions to cause the processor to control the first satellite signal receive chain to be active in response to receiving a request to acquire a third satellite signal from the at least one satellite of the constellation of satellites.

Clause 53. The storage medium of clause 52, wherein the processor-readable instructions to cause the processor to control the activation status comprise processor-readable instructions to cause the processor to control an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal.

Clause 54. The storage medium of clause 49, wherein the first satellite signal has a smaller bandwidth than the second satellite signal, and wherein the processor-readable instructions to cause the processor to control the activation status comprise processor-readable instructions to cause the processor to control the second satellite signal receive chain to be active, and at least one component of the first satellite signal receive chain to be inactive, in response to receiving a request to track the at least one satellite of the constellation of satellites with the second satellite signal.

Clause 55. The storage medium of clause 54, wherein the processor-readable instructions to cause the processor to control the activation status comprise processor-readable instructions to cause the processor to control the second satellite signal receive chain to be active, and the at least one component of the first satellite signal receive chain to be inactive, based on a determination that a time uncertainty of the user equipment is below a time uncertainty threshold and a position uncertainty of the user equipment is below a position uncertainty threshold.

Clause 56. The storage medium of clause 49, wherein the processor-readable instructions to cause the processor to control the activation status comprise processor-readable instructions to cause the processor to control, while the first satellite signal receive chain is active, the second satellite signal receive chain to become active, and then to control the first satellite signal receive chain to become inactive in response to receiving a request to track the at least one satellite of the constellation of satellites with the second satellite signal.

Clause 57. The storage medium of clause 56, further comprising processor-readable instructions to cause the processor to use one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active.

Clause 58. The storage medium of clause 49, wherein the processor-readable instructions to cause the processor to control the activation status comprise processor-readable instructions to cause the processor to control the activation status of the first satellite signal receive chain to be active, and the activation status of the second satellite signal receive chain to be active, in response to receiving a request to validate an acquired satellite signal from the at least one satellite of the constellation of satellites.

Clause 59. The storage medium of clause 58, wherein the processor-readable instructions to cause the processor to control the activation status comprise processor-readable instructions to cause the processor to control an activation status of at least one component of the second satellite signal receive chain to be inactive in response to validation of the acquired satellite signal.

Clause 60. The storage medium of clause 58, wherein the processor-readable instructions to cause the processor to control the activation status comprise processor-readable instructions to cause the processor to control, periodically, the second satellite signal receive chain to be active, while the first satellite signal receive chain is active and in response to receiving the request to validate the acquired satellite signal, to validate the acquired satellite signal.

Clause 61. The storage medium of clause 49, wherein the processor-readable instructions to cause the processor to control the activation status comprise processor-readable instructions to cause the processor to control the first satellite signal receive chain to be active, and the second satellite signal receive chain to be active, in response to receiving a request to determine an ionospheric delay from the at least one satellite of the constellation of satellites.

Clause 62. The storage medium of clause 61, wherein the processor-readable instructions to cause the processor to control the activation status comprise processor-readable instructions to cause the processor to control, periodically, the second satellite signal receive chain to be active while the first satellite signal receive chain is active and in response to receiving the request to determine the ionospheric delay.

Clause 63. The storage medium of clause 49, wherein the processor-readable instructions to cause the processor to control the activation status comprise processor-readable instructions to cause the processor to control at least one of the first satellite signal receive chain to be active, or the second satellite signal receive chain to be active, or a combination thereof, based on:

signal acquisition speeds associated with acquiring the first satellite signal and acquiring the second satellite signal, and a desired satellite signal acquisition speed; or position accuracy associated with the first satellite signal and the second satellite signal, and a desired position accuracy; or a combination thereof.

Clause 64. The storage medium of clause 49, wherein the processor-readable instructions to cause the processor to control the activation status comprise processor-readable instructions to cause the processor to control, in response to detection of jamming of the first satellite signal, at least one component of the first satellite signal receive chain to be inactive and the second satellite signal receive chain to be active.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
   a memory;
   a controller communicatively coupled to the memory; and
   a satellite positioning system receiver communicatively coupled to the controller and comprising:
      a first satellite signal receive chain configured to receive a first satellite signal, of a first frequency band, from at least one satellite of a constellation of satellites; and
      a second satellite signal receive chain configured to measure a second satellite signal, of a second frequency band, from the at least one satellite of the constellation of satellites;
   wherein the controller is configured to control an activation status of at least one of the first satellite signal receive chain or the second satellite signal receive chain, and
   wherein the first satellite signal has at least one of fewer associated search hypotheses than the second satellite signal or a smaller bandwidth than the second satellite signal, and wherein the controller is configured to control the first satellite signal receive chain to be active in response to receiving a request to acquire a third satellite signal from the at least one satellite of the constellation of satellites.

2. The user equipment of claim 1, wherein the controller is configured to control an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal.

3. The user equipment of claim 1, wherein the controller is configured to control, while the first satellite signal receive chain is active, the second satellite signal receive chain to become active, and then to control the first satellite signal receive chain to become inactive in response to receiving a request to track the at least one satellite of the constellation of satellites with the second satellite signal.

4. The user equipment of claim 3, further comprising a processor communicatively coupled to the satellite positioning system receiver and configured to use one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active.

5. The user equipment of claim 1, wherein the controller is configured to control the activation status of the first satellite signal receive chain to be active, and the activation status of the second satellite signal receive chain to be active, in response to receiving a request to validate an acquired satellite signal from the at least one satellite of the constellation of satellites.

6. The user equipment of claim 5, wherein the controller is configured to control an activation status of at least one component of the second satellite signal receive chain to be inactive in response to validation of the acquired satellite signal.

7. The user equipment of claim 5, wherein the controller is configured to control, periodically, the second satellite signal receive chain to be active, while the first satellite signal receive chain is active and in response to receiving the request to validate the acquired satellite signal, to validate the acquired satellite signal.

8. A user equipment comprising:
a memory;
a controller communicatively coupled to the memory; and
a satellite positioning system receiver communicatively coupled to the controller and comprising:
a first satellite signal receive chain configured to receive a first satellite signal, of a first frequency band, from at least one satellite of a constellation of satellites; and
a second satellite signal receive chain configured to measure a second satellite signal, of a second frequency band, from the at least one satellite of the constellation of satellites;
wherein the controller is configured to control an activation status of at least one of the first satellite signal receive chain or the second satellite signal receive chain; and
wherein the first satellite signal has a smaller bandwidth than the second satellite signal, and wherein the controller is configured to control the second satellite signal receive chain to be active, and at least one component of the first satellite signal receive chain to be inactive, in response to receiving a request to track the at least one satellite of the constellation of satellites with the second satellite signal.

9. The user equipment of claim 8, wherein the controller is configured to control the second satellite signal receive chain to be active, and the at least one component of the first satellite signal receive chain to be inactive, based on determining that a time uncertainty of the user equipment is below a time uncertainty threshold and a position uncertainty of the user equipment is below a position uncertainty threshold.

10. A user equipment comprising:
a memory;
a controller communicatively coupled to the memory; and
a satellite positioning system receiver communicatively coupled to the controller and comprising:
a first satellite signal receive chain configured to receive a first satellite signal, of a first frequency band, from at least one satellite of a constellation of satellites; and
a second satellite signal receive chain configured to measure a second satellite signal, of a second frequency band, from the at least one satellite of the constellation of satellites;
wherein the controller is configured to control an activation status of at least one of the first satellite signal receive chain or the second satellite signal receive chain,
wherein the controller is configured to control the first satellite signal receive chain to be active, and the second satellite signal receive chain to be active, in response to receiving a request to determine an ionospheric delay from the at least one satellite of the constellation of satellites.

11. The user equipment of claim 10, wherein the controller is configured to control, periodically, the second satellite signal receive chain to be active while the first satellite signal receive chain is active and in response to receiving the request to determine the ionospheric delay.

12. A user equipment comprising:
a memory;
a controller communicatively coupled to the memory; and
a satellite positioning system receiver communicatively coupled to the controller and comprising:
a first satellite signal receive chain configured to receive a first satellite signal, of a first frequency band, from at least one satellite of a constellation of satellites; and
a second satellite signal receive chain configured to measure a second satellite signal, of a second frequency band, from the at least one satellite of the constellation of satellites;
wherein the controller is configured to control an activation status of at least one of the first satellite signal receive chain or the second satellite signal receive chain; and
wherein the controller is configured to control at least one of the first satellite signal receive chain to be active, or the second satellite signal receive chain to be active, or a combination thereof, based on:
signal acquisition speeds associated with acquiring the first satellite signal and acquiring the second satellite signal, and a desired satellite signal acquisition speed; or
position accuracy associated with the first satellite signal and the second satellite signal, and a desired position accuracy; or
a combination thereof.

13. A satellite signal processing method comprising:
receiving, at a user equipment, a first satellite signal of a first frequency band from at least one satellite of a constellation of satellites;
receiving, at the user equipment, a second satellite signal of a second frequency band and from the at least one satellite of the constellation of satellites; and
controlling an activation status of at least one of: a first satellite signal receive chain, of the user equipment, configured to measure the first satellite signal; or a second satellite signal receive chain, of the user equipment, configured to measure the second satellite signal,
wherein the first satellite signal has at least one of fewer associated search hypotheses than the second satellite signal or a smaller bandwidth than the second satellite signal, and wherein controlling the activation status comprises controlling the first satellite signal receive chain to be active in response to receiving a request to acquire a third satellite signal from the at least one satellite of the constellation of satellites.

14. The satellite signal processing method of claim 13, wherein controlling the activation status comprises controlling an activation status of at least one component of the second satellite signal receive chain to be inactive based on at least one of a time uncertainty being above a time uncertainty threshold associated with the second satellite signal or a position uncertainty of the user equipment being above a position uncertainty threshold associated with the second satellite signal.

15. The satellite signal processing method of claim 13, wherein controlling the activation status comprises, while the first satellite signal receive chain is active, controlling the second satellite signal receive chain to become active, and then controlling the first satellite signal receive chain to become inactive in response to receiving a request to track the at least one satellite of the constellation of satellites with the second satellite signal.

16. The satellite signal processing method of claim 15, further comprising using one or more obtained satellite signal tracking parameters, corresponding to the first satellite signal from the at least one satellite of the constellation of satellites, to track the at least one satellite of the constellation of satellites with the second satellite signal while both the first satellite signal receive chain and the second satellite signal receive chain are active.

17. The satellite signal processing method of claim 13, wherein controlling the activation status comprises controlling the activation status of the first satellite signal receive chain to be active, and the activation status of the second satellite signal receive chain to be active, in response to receiving a request to validate an acquired satellite signal from the at least one satellite of the constellation of satellites.

18. The satellite signal processing method of claim 17, wherein controlling the activation status comprises controlling an activation status of at least one component of the second satellite signal receive chain to be inactive in response to validation of the acquired satellite signal.

19. The satellite signal processing method of claim 17, wherein controlling the activation status comprises controlling, periodically, the second satellite signal receive chain to be active, while the first satellite signal receive chain is active and in response to receiving the request to validate the acquired satellite signal, to validate the acquired satellite signal.

20. A satellite signal processing method comprising:
receiving, at a user equipment, a first satellite signal of a first frequency band from at least one satellite of a constellation of satellites;
receiving, at the user equipment, a second satellite signal of a second frequency band and from the at least one satellite of the constellation of satellites; and
controlling an activation status of at least one of: a first satellite signal receive chain, of the user equipment, configured to measure the first satellite signal; or a second satellite signal receive chain, of the user equipment, configured to measure the second satellite signal;
wherein the first satellite signal has a smaller bandwidth than the second satellite signal, and wherein controlling the activation status comprises controlling the second satellite signal receive chain to be active, and at least one component of the first satellite signal receive chain to be inactive, in response to receiving a request to track the at least one satellite of the constellation of satellites with the second satellite signal.

21. The satellite signal processing method of claim 20, wherein controlling the activation status comprises controlling the second satellite signal receive chain to be active, and the at least one component of the first satellite signal receive chain to be inactive, based on determining that a time uncertainty of the user equipment is below a time uncertainty threshold and a position uncertainty of the user equipment is below a position uncertainty threshold.

22. A satellite signal processing method comprising:
receiving, at a user equipment, a first satellite signal of a first frequency band from at least one satellite of a constellation of satellites;
receiving, at the user equipment, a second satellite signal of a second frequency band and from the at least one satellite of the constellation of satellites; and
controlling an activation status of at least one of: a first satellite signal receive chain, of the user equipment, configured to measure the first satellite signal; or a second satellite signal receive chain, of the user equipment, configured to measure the second satellite signal, wherein controlling the activation status comprises controlling the first satellite signal receive chain to be active, and the second satellite signal receive chain to be active, in response to receiving a request to determine an ionospheric delay from the at least one satellite of the constellation of satellites.

23. The satellite signal processing method of claim 22, wherein controlling the activation status comprises controlling, periodically, the second satellite signal receive chain to be active while the first satellite signal receive chain is active and in response to receiving the request to determine the ionospheric delay.

24. A satellite signal processing method comprising:
receiving, at a user equipment, a first satellite signal of a first frequency band from at least one satellite of a constellation of satellites;
receiving, at the user equipment, a second satellite signal of a second frequency band and from the at least one satellite of the constellation of satellites; and
controlling an activation status of at least one of: a first satellite signal receive chain, of the user equipment, configured to measure the first satellite signal; or a second satellite signal receive chain, of the user equipment, configured to measure the second satellite signal;
wherein controlling the activation status comprises controlling at least one of the first satellite signal receive chain to be active, or the second satellite signal receive chain to be active, or a combination thereof, based on:
signal acquisition speeds associated with acquiring the first satellite signal and acquiring the second satellite signal, and a desired satellite signal acquisition speed; or
position accuracy associated with the first satellite signal and the second satellite signal, and a desired position accuracy; or
a combination thereof.

25. A user equipment comprising:
means for measuring a first satellite signal of a first frequency band from at least one satellite of a constellation of satellites;
means for measuring a second satellite signal of a second frequency band and from the at least one satellite of the constellation of satellites; and
means for controlling an activation status of at least one of the means for measuring the first satellite signal or the means for measuring the second satellite signal,
wherein the first satellite signal has at least one of fewer associated search hypotheses than the second satellite signal or a smaller bandwidth than the second satellite signal, and wherein means for controlling the activation status comprises means for controlling the first satellite signal receive chain to be active in response to receiving a request to acquire a third satellite signal from the at least one satellite of the constellation of satellites.

26. A non-transitory, processor-readable storage medium comprising processor-readable instructions to cause a processor of a user equipment to:
control an activation status of at least one of a first satellite signal receive chain of the user equipment or a second satellite signal receive chain of the user equipment;
wherein the first satellite signal receive chain is configured to measure a first satellite signal, of a first frequency band, from at least one satellite of a constellation of satellites;
wherein the second satellite signal receive chain is configured to measure a second satellite signal, of a second frequency band and from the at least one satellite of the constellation of satellites; and
wherein the first satellite signal has at least one of fewer associated search hypotheses than the second satellite signal or a smaller bandwidth than the second satellite signal, and wherein the processor-readable instructions to control the activation status comprises processor-readable instructions to control the first satellite signal receive chain to be active in response to receiving a request to acquire a third satellite signal from the at least one satellite of the constellation of satellites.

* * * * *